United States Patent
Maier

(10) Patent No.: US 8,494,371 B2
(45) Date of Patent: Jul. 23, 2013

(54) ARCHITECTURE OF AN OPTICAL REFUELING COMMUNICATION USING GLASS FIBER

(75) Inventor: Oliver Maier, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 337 days.

(21) Appl. No.: 12/967,554

(22) Filed: Dec. 14, 2010

(65) Prior Publication Data

US 2012/0148263 A1 Jun. 14, 2012

(51) Int. Cl.
*H04B 10/00* (2013.01)
*G02B 6/42* (2006.01)

(52) U.S. Cl.
CPC .................. *G02B 6/4246* (2013.01)
USPC ......................... 398/139; 398/172

(58) Field of Classification Search
USPC ................... 398/172, 139; 141/231
See application file for complete search history.

(56) References Cited

U.S. PATENT DOCUMENTS

| | | | | |
|---|---|---|---|---|
| 4,948,218 A | * | 8/1990 | Kobayashi et al. | 398/141 |
| 5,343,906 A | * | 9/1994 | Tibbals, III | 141/83 |
| 5,659,378 A | * | 8/1997 | Gessel | 349/96 |
| 7,095,055 B2 | * | 8/2006 | Estevez-Garcia | 257/83 |
| 8,340,481 B2 | * | 12/2012 | Levinson | 385/31 |
| 2007/0139316 A1 | * | 6/2007 | Hyatt | 345/82 |
| 2008/0231836 A1 | * | 9/2008 | Curello et al. | 356/72 |
| 2009/0226139 A1 | * | 9/2009 | Yuang | 385/93 |
| 2012/0143438 A1 | * | 6/2012 | Heiden | 701/36 |

* cited by examiner

*Primary Examiner* — Dalzid Singh
(74) *Attorney, Agent, or Firm* — Dinsmore & Shohl LLP

(57) ABSTRACT

A communication interface for communication between a storage tank and a refueling station is described. One embodiment of the communication interface includes a control unit; an optical transmitter comprising an IR-LED, the optical transmitter directly integrated into the control unit or mounted on the control unit; and an optical frontend optically connected to the optical transmitter.

11 Claims, 2 Drawing Sheets

ARCHITECTURE OF AN OPTICAL REFUELING COMMUNICATION USING GLASS FIBER

BACKGROUND OF THE INVENTION

The invention relates generally to fueling of compressed gas tanks, and more particularly, to methods and apparatus for controlling fueling of compressed gas tanks.

Typically, the driver fuels the vehicle at a filling station. Hydrogen vehicles have a defined infrared communication protocol between the refueling station and the vehicle. It is a unidirectional communication (vehicle to refuel station) based on an infrared signal (SAE J 2601, SAE J 2799). Infrared (IR) LEDs and the RDI controller which communicate with a vehicle controller are mounted next to the receptacle. Additional LEDs for showing information concerning the state of the refueling process can also be installed.

FIG. 1 is an illustration of a standard communication interface between a vehicle 10 and a refueling station 15. The vehicle engine control unit (ECU) 20 has an electrical connection 25 to the RDI-controller 30, which is mounted next to the receptacle where the refueling nozzle is connected, typically towards the back of the vehicle. The wiring harness for the electrical connection 25 has four to five single wires, for example, for the power supply, a ground, an enable pin, communication, and the like. The number of wires will vary depending on the specific system being used. The RDI-controller 30 has an electrical connection 35 to the optical frontend 40, which is mounted around the receptacle. IR-LEDs 45 and visible state LEDs 50 are located in the optical frontend 40. The visible LEDs 50 show the driver the state of the refuel/vehicle. The electrical connection 35 has four single wires, for example. The signal from the IR-LEDs 45 is received by the refuel nozzle 55, which is part of the refueling station 15

The optical frontend, which includes the IR-LEDs and the state LEDs, has low reliability. High temperature variation and high temperature gradients next to the receptacle result in high thermal stress for the diodes. Condensation can occur, leading to corrosion and reducing contact resistance. In addition, the mechanical stress caused by thermal expansion can shear off the diode contacts. Furthermore, the stand-alone RDI controllers need a CAN node, increasing the bus traffic which is undesirable.

SUMMARY OF THE INVENTION

One aspect of the invention is a communication interface for communication between a storage tank and a refueling station. One embodiment of the communication interface includes a control unit; an optical transmitter comprising an IR-LED, the optical transmitter directly integrated into the control unit or mounted on the control unit; and an optical frontend optically connected to the optical transmitter.

Another aspect of the invention is a communication interface for communication between a vehicle and a refueling station. One embodiment of the communication interface includes a vehicle engine control unit; an optical transmitter comprising an IR-LED, the optical transmitter directly integrated into the vehicle engine control unit or mounted on the vehicle engine control unit; and an optical frontend optically connected to the optical transmitter using a glass fiber.

DETAILED DESCRIPTION OF THE INVENTION

Although the following discussion refers to hydrogen fueling of a vehicle for ease of discussion, those of skill in the art will recognize that other compressed gases could be used, as well as other fueling applications.

An improved communication interface integrates the IR LEDs and optional visible LEDs into an existing vehicle control module. This allows the processor of the vehicle controller to control the IR LEDs and visible LEDs which are positioned in an optical transmitter. An optical connection is used to connect the IR LEDs and visible LEDs to the optical front end at the receptacle of the tank cavity.

The improved communication interface is safer than a conventional communication interface because there are no electrical parts which can cause sparks next to the receptacle. In addition, there are no electromagnetic compatibility problems because there is no electrical wiring. Furthermore, thermal stress is reduced because there are no bulbs or LEDs next to the receptacle. The bulbs and LEDs do not affect the glass fiber, leading to higher reliability.

The improved communication interface can also reduce costs. An additional vehicle controller is not required because it is integrated into an existing vehicle controller. The integration eliminates the need for an additional CAN node, which reduces bus traffic and lowers cost. The use of one or two glass fibers instead of two harnesses with four to five wires each further reduces costs. Fewer parts reduces service costs as well.

Figure 1:
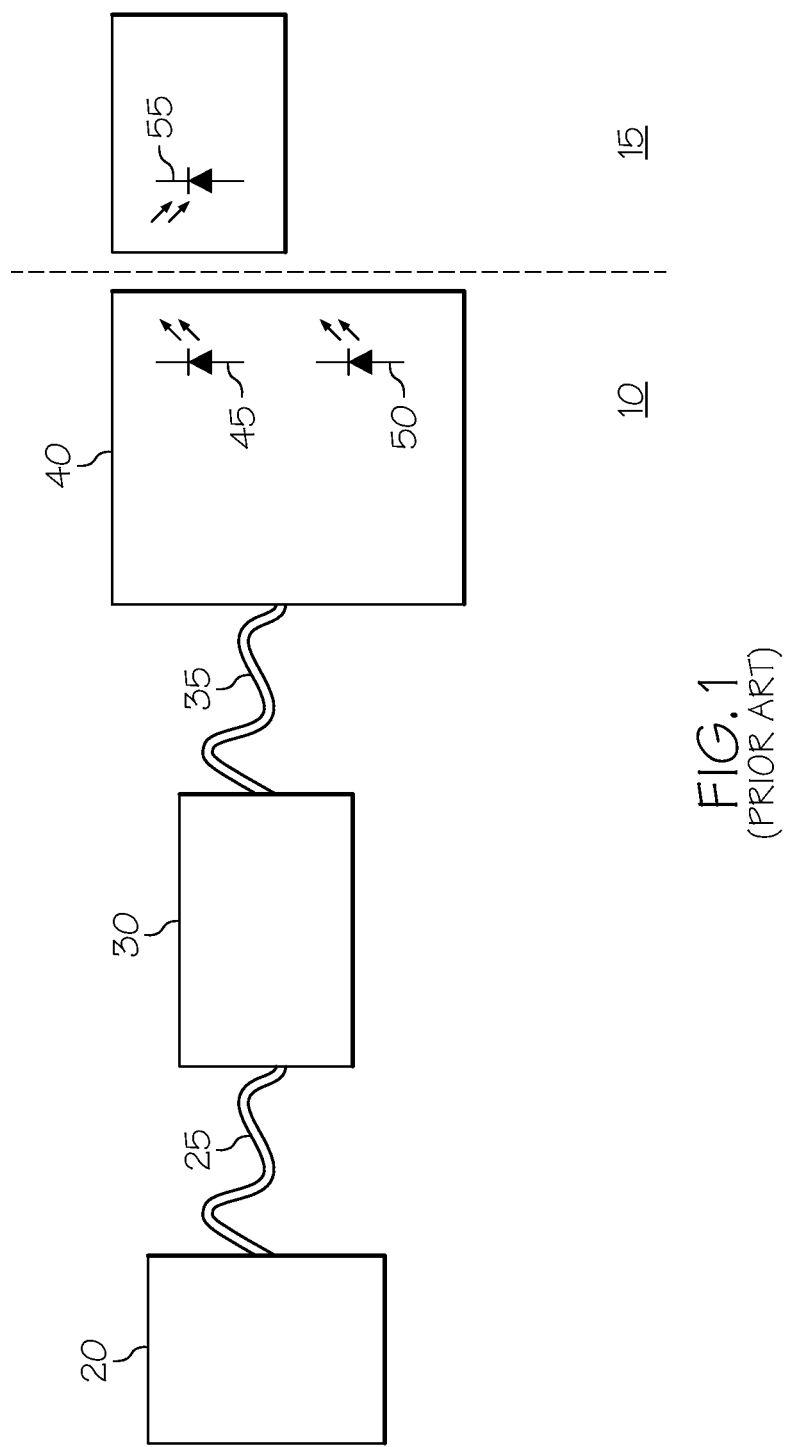
FIG. 1 is an illustration of a standard configuration of a communication interface between a vehicle and a refueling station.
Figure 2:
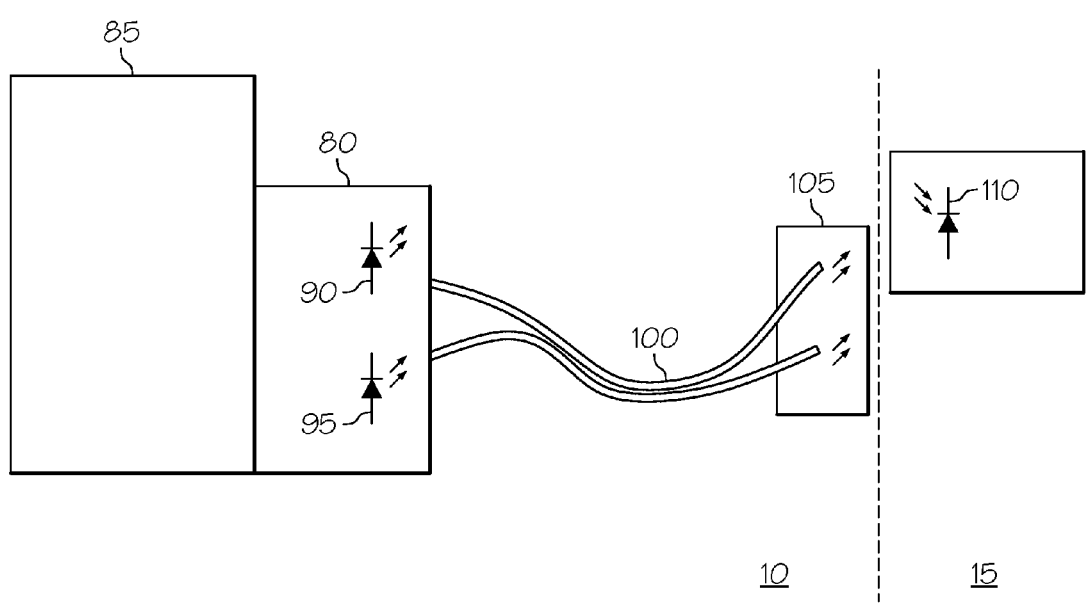
FIG. 2 is an illustration of the one embodiment of a communication interface between a vehicle and a refueling station according to the invention.

FIG. 2 illustrates one embodiment of the improved communication interface. An optical transmitter 80 can be directly integrated into an existing vehicle ECU 85, or it can be mounted next to the vehicle ECU 85. When the optical transmitter 80 is directly integrated into the vehicle ECU 85, no additional RDI-controller processor is necessary. The IR LEDs and visible LEDs can be directly connected to the power output pins of the vehicle ECU 85. Alternatively, a simple power driver circuit with the IR LEDs and visible LEDs can be connected to the digital outputs of the vehicle ECU 85. If the optical transmitter 80 is mounted next to the vehicle ECU 85 and not integrated into the vehicle ECU, it does not have a processor. No high controller performance is needed for the refuel communication, which reduces the performance decrease of the main vehicle ECU functionality.

The IR-LEDs 90 and visible state LEDs 95 are located in the optical transmitter 80. There can be one or more IR LEDs 90, and optionally one or more visible LEDs 95. There is an optical connection 100 between the optical transmitter 80 and the optical frontend 105. The signal from the IR-LEDs 90 is sent through the optical connection 100 to the optical frontend 105 and is transmitted to and received by the refuel nozzle 110. The light from the visible LEDs 95 is sent through the optical connection to the optical frontend where it can be observed by the user. The optical frontend includes lenses and the like as is known to those of skill in the art so that the signal from the IR LED can be transmitted to the refuel nozzle and the visible light from the visible LEDs can be seen. The optical frontend is in optical contact with the refuel nozzle.

The optical connection 100 can be one or more glass fibers. If visible state LEDs 95 are not required, only one glass fiber would be needed. If visible LEDs are used, e.g., red and green, as well as the IR LEDs, one glass fiber would be needed for each wave-length. In that case, three fibers would be needed: one for red, one for green and one for IR. There are special polarized glass fibers available, which can be modulated with different wave-lengths. In this case, one fiber could be used for all three. However, the polarized glass fibers are more expensive than non-polarized.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A communication interface for communication between a vehicular storage tank and a refueling station comprising:
    a vehicle engine control unit;
    an optical transmitter comprising an IR-LED, the optical transmitter directly integrated into the vehicle engine control unit or mounted on the vehicle engine control unit; and
    an optical frontend optically connected to the optical transmitter to provide communication between the vehicular storage tank and the refueling station.

2. The communication interface of claim 1 wherein the optical frontend is optically connected to the optical transmitter using a glass fiber.

3. The communication interface of claim 2 wherein there is more than one glass fiber.

4. The communication interface of claim 2 wherein the glass fiber is polarized.

5. The communication interface of claim 1 wherein the optical transmitter further comprises a visible LED.

6. The communication interface of claim 1 wherein the optical frontend comprises a lens.

7. A communication interface for communication between a vehicle and a refueling station comprising:
    a vehicle engine control unit;
    an optical transmitter comprising an IR-LED, the optical transmitter directly integrated into the vehicle engine control unit or mounted on the vehicle engine control unit; and
    an optical frontend optically connected to the optical transmitter using a glass fiber to provide communication between the vehicular storage tank and the refueling station.

8. The communication interface of claim 7 wherein there is more than one glass fiber.

9. The communication interface of claim 7 wherein the glass fiber is polarized.

10. The communication interface of claim 7 wherein the optical transmitter further comprises a visible LED.

11. The communication interface of claim 7 wherein the optical frontend comprises a lens.

* * * * *